United States Patent
Pentakota

(10) Patent No.: US 11,159,579 B2
(45) Date of Patent: Oct. 26, 2021

(54) CONTROL MECHANISM FOR SUPPORTING SERVICES IN MOBILE EDGE COMPUTING ENVIRONMENT

(71) Applicant: Nokia Solutions and Networks Oy, Espoo (FI)

(72) Inventor: Hema Pentakota, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/478,792

(22) PCT Filed: Apr. 3, 2017

(86) PCT No.: PCT/EP2017/057803
§ 371 (c)(1),
(2) Date: Jul. 17, 2019

(87) PCT Pub. No.: WO2018/133956
PCT Pub. Date: Jul. 26, 2018

(65) Prior Publication Data
US 2019/0380025 A1 Dec. 12, 2019

Related U.S. Application Data

(60) Provisional application No. 62/447,622, filed on Jan. 18, 2017.

(51) Int. Cl.
*H04W 12/80* (2021.01)
*H04L 29/06* (2006.01)

(52) U.S. Cl.
CPC .......... *H04L 63/306* (2013.01); *H04W 12/80* (2021.01)

(58) Field of Classification Search
CPC .................... H04L 2209/80; H04W 4/025
(Continued)

(56) References Cited

U.S. PATENT DOCUMENTS 8,891,397 B2 11/2014 Anthony, Jr. et al.
9,071,450 B2 6/2015 Billau et al.
(Continued)

FOREIGN PATENT DOCUMENTS

WO  WO 2016134772 A1  9/2016
WO  WO 2017088501 A1  6/2017
WO  WO 2017151025 A1  9/2017

OTHER PUBLICATIONS

Nokia, "Applications at the network Edge," Nokia Solutions and Networks Oy Technical Brief, networks.nokia.com, 2016, 14 pages.
(Continued)

*Primary Examiner* — Kiet M Doan
(74) *Attorney, Agent, or Firm* — Tong, Rea, Bentley & Kim, LLC

(57) ABSTRACT

An apparatus for use by a mobile edge control element or function, the apparatus comprising at least one processing circuitry, and at least one memory for storing instructions to be executed by the processing circuitry, wherein the at least one memory and the instructions are configured to, with the at least one processing circuitry, cause the apparatus at least: to participate in a mobile edge computing based communication of at least one communication element in a communication network, to prepare and send a special data packet to a core network control element or function, wherein the special data packet includes, as a packet source indication, an address information of the at least one communication element and, as a packet destination indication, an address information of the mobile edge control element or function, to receive and process an enriched data packet being based on the special data packet, the enriched data packet including subscriber related identification data for the at least one communication element, to collect the subscriber related identification data from the enriched data packet, and to conduct a communication related processing related to the at (Continued)

least one communication element using the collected subscriber related identification data.

16 Claims, 7 Drawing Sheets

(58) Field of Classification Search
USPC .............. 370/328, 252, 389, 236, 331, 235; 455/574, 456.3, 452.1
See application file for complete search history.

(56) References Cited

U.S. PATENT DOCUMENTS

| | | | |
|---|---|---|---|
| 9,641,697 B2 | 5/2017 | Wu et al. | |
| 2014/0241152 A1* | 8/2014 | Anthony, Jr. | H04W 28/0231 370/230 |
| 2014/0241158 A1* | 8/2014 | Anthony, Jr. | H04W 28/0231 370/235 |
| 2015/0365819 A1* | 12/2015 | Zhu | H04W 8/22 455/418 |
| 2017/0099229 A1* | 4/2017 | Suga | H04L 43/0829 |
| 2017/0237863 A1 | 8/2017 | Frydman et al. | |
| 2019/0082057 A1* | 3/2019 | Westberg | H04M 15/852 |

OTHER PUBLICATIONS

Vodafone, "Impact on Lawful Interception of Mobile Edge Computing," vol. SA WG3, Oct. 28, 2014 (Oct. 28, 2014), 3GPP Draft; LI Impact of MEC, 3RD Generation Partnership Project (3GPP), Mobile Competence Centre; Sophia-Antipolis Cedex; France, Retrieved from Internet: URL:http://www.3gpp.org/ftp/tsg_sa/WG3_Security/TSGS3_LI/2014_55_Portland/, XP050895700, 5 pages.

3RD Generation Partnership Project (3GPP), "3rd Generation Partnership Project; Technical Specification Group Services and System Aspects; Study on the security aspects of the next generation system (Release 14)," 3GPP Standard; 3GPP TR 33.899, Mobile Competence Centre; 650, Route Des Lucioles; F-06921 Sophia-Antipolis Cedex; France, vol. Sa WG3, No. V0.5.0, Oct. 11, 2016 (Oct. 11, 2016), pp. 1-244, XP051173061.

European Telecommunications Standards Institute (Etsi), "Lawful Interception (LI); Concepts of Interception in a Generic Network Architecture," ETSI TR 101 943, Etsi Draft; Etsi Tr 101 943, 650, Route Des Lucioles; Sophia-Antipolis; France, No. V2.1.1, Oct. 2004, pp. 1-30.

Mueller, J. et al., "Mobility Management Using Identifier Locator Addressing", Internet Draft, draft-mueller-ila-mobility, Oct. 27, 2016, 24 pages.

* cited by examiner

CONTROL MECHANISM FOR SUPPORTING SERVICES IN MOBILE EDGE COMPUTING ENVIRONMENT

CROSS-REFERENCE TO RELATED APPLICATIONS

The present application claims priority to PCT Patent Application Number PCT/EP2017/057803, entitled "Control Mechanism for Supporting Services in Mobile Edge Computing Environment" and having an international filing date of Apr. 3, 2017, the entirety of which is incorporated by reference herein, and which claims priority to U.S. Provisional Patent Application Ser. No. 62/447,622, which has a filing date of Jan. 18, 2017, the entirety of which is incorporated by reference herein.

BACKGROUND

Field

The present invention relates to apparatuses, methods, systems, computer programs, computer program products and computer-readable media usable for conducting a control for supporting services in a mobile edge computing (MEC) system, in particular legal interception and charging related services for a MEC system working in a telecommunication network.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP: 3rd Generation Partner Project
ADMF: administration function
appl.: application
ARP: allocation and retention priority
BOSS: billing and order support system
BS: base station
CC: communication context
CDR: call data record
CMD: charging media gateway
CN: core network
CPU: central processing unit
DB: database
dest: destination
e2e: end-to-end
eNB: evolved node B
E-RAB: evolved radio access bearer
EPC: evolved packet core
ETSI European Telecommunications Standards Institute
GPRS: general packer radio services
GTP: GPRS tunneling protocol
GW: gateway
HI: handover interface
HTTP: hypertext transfer protocol
ID: identification, identifier
IMSI: international mobile subscriber ID
IP: Internet protocol
IRI: intercept related information
LEA: law enforcement agencies
LEMF: law enforcement monitoring facility
LIG: lawful interception gateway
LTE: Long Term Evolution
LTE-A: LTE Advanced
MEC: mobile edge computing
MSISDN: mobile station international subscriber directory number
MME: mobility management entity
OTT: over-the-top
PCC: policy and charging control
QCI: quality class indicator
SGW: serving gateway
SPID: subscriber profile identity
src: source
UE: user equipment
UMTS: universal mobile telecommunication system
VNF: virtual network function
VRF: virtual routing and forwarding Embodiments of the present invention are related to a mechanism which supports charging and lawful interception in MEC solutions provided in a telecommunication network.

SUMMARY

According to an example of an embodiment, there is provided, for example, an apparatus for use by a mobile edge control element or function, the apparatus comprising at least one processing circuitry, and at least one memory for storing instructions to be executed by the processing circuitry, wherein the at least one memory and the instructions are configured to, with the at least one processing circuitry, cause the apparatus at least: to participate in a mobile edge computing based communication of at least one communication element in a communication network, to prepare and send a special data packet to a core network control element or function, wherein the special data packet includes, as a packet source indication, an address information of the at least one communication element and, as a packet destination indication, an address information of the mobile edge control element or function, to receive and process an enriched data packet being based on the special data packet, the enriched data packet including subscriber related identification data for the at least one communication element, to collect the subscriber related identification data from the enriched data packet, and to conduct a communication related processing related to the at least one communication element using the collected subscriber related identification data.

Furthermore, according to an example of an embodiment, there is provided, for example, a method for use by a mobile edge control element or function, the method comprising participating in a mobile edge computing based communication of at least one communication element in a communication network, preparing and sending a special data packet to a core network control element or function, wherein the special data packet includes, as a packet source indication, an address information of the at least one communication element and, as a packet destination indication, an address information of the mobile edge control element or function, receiving and processing an enriched data packet being based on the special data packet, the enriched data packet including subscriber related identification data for the at least one communication element, collecting the subscriber related identification data from the enriched data packet, and conducting a communication related processing related to the at least one communication element using the collected subscriber related identification data.

According to further refinements, these examples may include one or more of the following features:

the mobile edge computing based communication of the at least one communication element in the communication network being participated may comprise a local breakout based on filters being different to the subscriber related identification data;

the subscriber related identification data may comprise at least one of an international mobile subscriber ID, a mobile station international subscriber directory number, and an IP address of the at least one communication element;

as the communication related processing related to the at least one communication element, at least one of a charging processing and a lawful interception processing may be conducted;

when the communication related processing being conducted is a charging processing, call data record data related to the mobile edge computing based communication of the at least one communication element may be to prepared and included, into the special data packet, and the special data packet may be sent via a user plane data communication to the core network control element or function when at least one of a bearer release, a handover to a different coverage area and a termination of the mobile edge computing based communication of the at least one communication element occurs;

when the communication related processing being conducted is a charging processing, a data set related to the subscriber related identification information and including call data record data related to the mobile edge computing based communication of the at least one communication element may be generated, and the data set may be sent to a billing and order support system of the communication network;

when the communication related processing being conducted is a lawful interception processing, the special data packet may be sent when a first user plane packet for the at least one communication element is received;

when the communication related processing being conducted is a lawful interception processing, a lawful interception demand may be received from an administration function of a lawful interception gateway element or function and processed, the demand including subscriber related identification information for a communication element whose traffic is to be intercepted, the traffic to be intercepted may be determined on the basis of the subscriber related identification information received in the lawful interception demand and the subscriber related identification information received in the enriched data packet, and the determined traffic to be intercepted may be forwarded to the lawful interception gateway element or function;

the mobile edge control element or function may be one of a mobile edge computing server, a mobile edge computing charging server and a mobile edge platform, the communication network control element or function may be one of a core network control element or function, in particular a packet gateway of a cellular communication network, and the communication element may be a user equipment or terminal device capable of communicating in the cellular communication network.

Furthermore, according to an example of an embodiment, there is provided, for example, an apparatus for use by a communication network control element or function, the apparatus comprising at least one processing circuitry, and at least one memory for storing instructions to be executed by the processing circuitry, wherein the at least one memory and the instructions are configured to, with the at least one processing circuitry, cause the apparatus at least: to receive a special data packet from a mobile edge control element or function, wherein the special data packet includes, as a packet source indication, an address information of at least one communication element and, as a packet destination indication, an address information of the mobile edge control element or function, to process the special data packet, when it is determined that the packet source indication is an address information of at least one communication element and the packet destination indication is an address information of the mobile edge control element or function, wherein the processing includes preparing an enriched data packet by enriching the data contained in the special data packet with subscriber related identification data for the at least one communication element, and to send the enriched data packet to the mobile edge control element or function indicated in the packet destination indication.

In addition, according to an example of an embodiment, there is provided, for example, a method for use by a communication network control element or function, the method comprising receiving a special data packet from a mobile edge control element or function, wherein the special data packet includes, as a packet source indication, an address information of at least one communication element and, as a packet destination indication, an address information of the mobile edge control element or function, processing the special data packet, when it is determined that the packet source indication is an address information of at least one communication element and the packet destination indication is an address information of the mobile edge control element or function, wherein the processing includes preparing an enriched data packet by enriching the data contained in the special data packet with subscriber related identification data for the at least one communication element, and sending the enriched data packet to the mobile edge control element or function indicated in the packet destination indication.

According to further refinements, these examples may include one or more of the following features:

for sending the enriched data packet to the mobile edge control element or function indicated in the packet destination indication, a virtual routing and forwarding processing may be executed;

the subscriber related identification data may comprise at least one of an international mobile subscriber ID, a mobile station international subscriber directory number, and an IP address of the at least one communication element;

the communication network control element or function may be one of a core network control element or function, in particular a packet gateway of a cellular communication network, the mobile edge control element or function may be one of a mobile edge computing server, a mobile edge computing charging server and a mobile edge platform, and the communication element may be a user equipment or terminal device capable of communicating in the cellular communication network.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
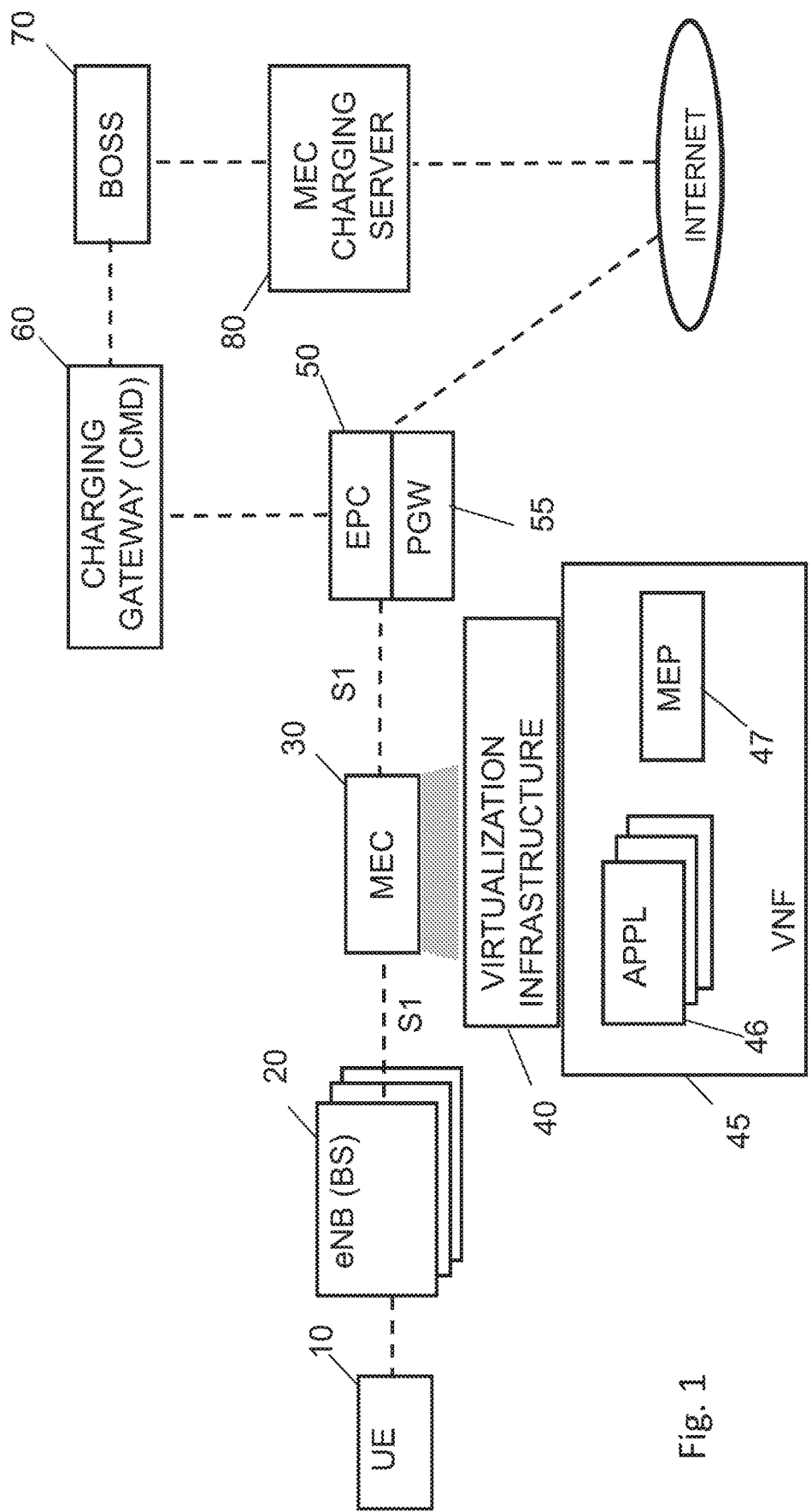
FIG. 1 shows a diagram illustrating a configuration of communication network environment where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), fourth generation (4G) communication networks or enhanced communication networks based e.g. on LTE or LTE-A, fifth generation (5G) communication networks, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Generally, for properly establishing and handling a communication connection between two or more end points (e.g. communication stations or elements, such as terminal devices, user equipments (UEs), or other communication network elements, a database, a server, host etc.), one or more network elements such as communication network control elements, for example access network elements like access points, radio base stations, eNBs etc., and core network elements or functions, for example control nodes, support nodes, service nodes, gateways etc., may be involved, which may belong to one communication network system or different communication network systems.

Currently, mobile edge computing (MEC) is under development in the telecommunication field. MEC provides IT and cloud-computing capabilities within a radio access network in close proximity to mobile subscribers. For application developers and content providers, the access network edge offers a service environment with low latency and high-bandwidth as well as direct access to real-time radio network information (such as subscriber location, cell load, etc.) that can be used by applications and services to offer, for example, context-related services. Furthermore, applications and services offered by a MEC server may be provided by different service providers. Applications and services offered by a MEC server may be used by network users/subscribers either in sessions between a communication element such as a UE and a server element, also referred to as a MEC server, or as intermediate data flow manipulators in sessions between a UE and e.g. the Internet.

One element of MEC is the MEC server (or MEC host). The MEC server is, for example, integrated at a radio access network element, e.g. in an eNB site, or at a radio network controller element or a multi-technology (e.g. 3G/LTE) cell aggregation site. The MEC server provides computing resources, storage capacity, connectivity, and access to user traffic and radio and network information. For this purpose, a MEC server platform consists of several parts including a hosting infrastructure and an application platform. The MEC hosting infrastructure consists, for example, of hardware resources and a virtualization layer. The MEC application platform provides the capabilities for hosting applications and consists of the application's virtualization manager and application platform services. These MEC application-platform services provide middleware services to the applications which are hosted on the MEC server, such as an infrastructure service, communication services, location service, service registry, radio network information services and traffic offload function.

MEC solutions involve interception traffic to and from the cellular telecommunication infrastructure to which it is connected. For example, traffic between the access network edge (e.g. an eNB to which a MEC entity is attached) and the core network of the telecommunication network, for example traffic transmitted via a S1 interface in LTE based networks, and/or traffic between different access network edge elements or functions, for example traffic transmitted via a X2 interface connecting different eNBs.

For traffic routing, MEC offers the possibility for local breakout. Local breakout means that for a user which makes mobility within and across one operator-defined network region, routing is optimized such that user plane traffic does not need to leave the current region. An operator may define network regions e.g. according to administrative domains. Local breakout is applicable for e2e traffic, such as user-to-user traffic, as well as for operator provided services (including internet access). Local breakout is done at MEC based on specified filters. For example, E-RAB policy filters including QCI, SPID, ARP, and L3/L4 filters, like a 5-tuple comprising of UE IP, Network IP, UE port number, network port number, protocol type, can be used as corresponding filters for local breakout at MEC.

However, due to the used filters and the related information, local breakout at MEC does not include all types of information which may be required by other services. For example, specific subscriber related identification information, such as IMSI or MSISDN, which for a basis for several procedures and services, are not available at the MEC part. Hence, procedures like LI and charging have to be planned separately. This is not optimal for network provides requiring e2e solutions which address corresponding solutions.

Consequently, according to examples of embodiments of the invention, it is desired to provide a mechanism usable for conducting a control for supporting services in a MEC system, and in particular allowing to obtain subscriber related identification information, such as IMSI or MSISDN, in connection with MEC based communication scenarios.

In the following, different exemplifying embodiments will be described using, as an example of a communication network to which the embodiments may be applied, a communication network architecture based on 3GPP standards, such as LTE or LTE-A communication networks, without restricting the embodiments to such architectures, however. It is obvious for a person skilled in the art that the embodiments may also be applied to other kinds of communication networks having suitable means by adjusting parameters and procedures appropriately, e.g. 5G networks, WiFi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile edge computing (MEC) environment, but principles of the invention can be extended and applied to any other type of combinations of radio access networks and IT computing configurations being similar or comparable to MEC principles.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a communication system where some examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point (AP), a NodeB (NB) or an eNB, which control a respective coverage area or cell(s) and with which one or more communication stations such as communication elements, user devices or terminal devices, like a UE or a machine-to-machine communication terminal, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels for transmitting several types of data in a plurality of access domains. Furthermore, core network elements such as gateway network elements, mobility management entities, a mobile switching center, servers, databases and the like are included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a radio network controller, and other elements of the same or other communication networks besides those described in detail herein below.

A communication network as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage.

Furthermore, a network element, such as communication elements, like a UE, a terminal device in a machine-to-machine communication element, control elements or functions, such as access network elements, like a base station, an eNB, a radio network controller, other network elements, like a core network element, a mobility management element or function, a server, etc., as well as corresponding functions as described herein, and other elements, functions or applications may be implemented by software, e.g. by a computer program product for a computer, and/or by hardware. For executing their respective functions, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

According to examples of embodiments of the invention, a mechanism for supporting services in a MEC system and in particular allowing to obtain subscriber related identification information, such as IMSI or MSISDN, in connection with MEC based communication scenarios is achieved by the following processing. Specifically, when a MEC based communication for one or more communication elements like UEs is executed, such as a local breakout at MEC, where specific subscriber related identification information such as IMSI or MSISDN is missing, a MEC control element or function, e.g. a MEC server, involved in the MEC based communication sends a special data packet to the core network, i.e. to a core network control element or function like a PGW. This special data packet has, for example, a specific structure and/or a specific content. In particular, the special data packet includes, as a packet source indication, an address information of the communication element, such as the UE IP address, which is known to in the MEC based communication, and, as a packet destination indication, an address information of the MEC control element or function, for example the IP address of the MEC server. The core network control element or function, when receiving the special packet, recognizes from the content that it is necessary to include into the packet (i.e. to enrich the packet by) subscriber related identification information for the UE being indicated by the UE IP address, for example. That is, the core network provides an enriched data packet by adding to the special data packet the required subscriber related identification information, such as the IMSI and/or the MSISDN, and sending the enriched data packet to the destination indicated in the special data packet (i.e. back to the MEC control element or function). Here, the subscriber related identification data can be collected from the enriched data packet and used in the corresponding communication related processing, such as a LI or a charging procedure.

With regard to FIG. 1, a diagram illustrating a configuration of communication network environment where some examples of embodiments are implementable. Specifically, the example shown in FIG. 1 is related to a case where a local breakout at MEC is made, and subscriber related identification information are required for charging procedure.

It is to be noted that the structure indicated in FIG. 1 shows only a simplified architecture and hence those parts which are useful for understanding principles underlying some examples of embodiments of the invention. As also known by those skilled in the art there may be several other network elements or devices involved e.g. in a communication which are omitted here for the sake of simplicity. Furthermore, it is to be noted that links indicated in FIG. 1 are intended to show only principle examples of connections between respective network parts. It is possible that also additional or alternative links besides those indicated in FIG. 1 are provided in a corresponding network, and/or that respective network elements or functions communicate with other network elements or functions by using intermediate nodes shown or not shown in FIG. 1. It is to be noted that examples of embodiments are not limited to the number of communication stations, elements, functions, and links as indicated in FIG. 1, i.e. there may be implemented or present less of or more of the corresponding stations, elements, functions, and links than those shown in FIG. 1.

As shown in FIG. 1, a communication element 10, such as a UE, is located within a communication network. Access to the communication network is provided by one or more control elements or functions 20, such as access points or base stations providing a wireless interface between the communication element 10 and the network. An example of such an access network element 20 is an eNB as indicated in FIG. 1 which is a control element of a so-called macro cell. It is to be noted that more than one access network element of a corresponding type may be provided in the communication network, wherein each thereof is covering a corresponding coverage area. Furthermore, additional or alternative access network elements can be provided, which use the same or another radio access technology, such as relay nodes, control elements or functions of small cells (micro, pico etc. cell), wireless local area network nodes and the like, which can be seen in the context of examples of embodiments as corresponding access network elements or functions for the UE 10.

Reference sign 30 denotes a MEC control element or function, such as a MEC server, a MEC charging server, a MEC host, and the like. For the sake of simplicity, in the following, the MEC control element or function will be referred to as MEC server 30. The MEC server 30 comprises, for example, a mobile edge platform (MEP) 47, one or more applications 46 running on the MEC server 30, which are realized for example in a VNF environment 45. The VNF 45 is realized in physical resources by means of the virtualization infrastructure 40, which for the MEC server 30. The control element or function 20 (e.g. eNB) is connected to the MEC server 30 by means of a suitable interface.

The MEP 47 is a collection of essential functionality required to run mobile edge applications on the virtualization infrastructure and to enable them to provide and consume mobile edge services. For example, MEP 47 is responsible for offering an environment where the mobile edge applications can discover, advertise, consume and offer mobile edge services, receiving traffic rules from a MEP manager (not shown), applications, or services, hosting mobile edge services, etc. Furthermore, a charging data function can be provided.

The virtualization infrastructure 40 provides compute, storage, and network resources, for the purpose of running the mobile edge applications. Traffic rules received by the MEP 47 are executed, and the traffic is routed among applications, services, the communication network, local and external networks.

The applications 46 are instantiated on the virtualization infrastructure of the MEC server 30 based on configuration or requests validated by mobile edge management. For example, mobile edge applications are running as virtual machines (VM) on top of the virtualization infrastructure provided by the mobile edge host, and can interact with the MEP 47 to consume and provide mobile edge services. Mobile edge applications 46 may have a certain number of rules and requirements associated to them, such as required resources, maximum latency, required or useful services, etc.

Reference sign 50 denote the core network of the communication network, such as EPC, wherein reference sign 55 denotes a core network control element or function of the EPC 50, such as a PGW. The core network control element or function 55 (e.g. the PGW) is connected to the MEC server 30 by means of a suitable interface. Furthermore, the PGW 55 provides a connection to other networks, for example the Internet.

Reference sign 60 denotes a charging gateway. The charging gateway 60 is, for example, a flexible convergent mediation device which enables an integration of services like Voice over LTE and the EPC with a charging and billing infrastructure. The charging gateway 60 is connected to the EPC by means of a corresponding interface.

Reference sign 70 denotes a billing and order support system (BOSS). The BOSS 70 represents a part of the charging and billing infrastructure and allows access to and contains bill and credit information, equipment information, carrier billing information, customer context notes and payment history data.

Reference sign 80 denotes a MEC charging server. In the present example according to FIG. 1, it is assumed that the MEC charging server 80 is an application sitting behind the core network 50. That is, the MEC charging server 80 can act like any application server. For example, the MEC charging server 80 is able to send data packets back via a backhaul (e.g. via Internet/PGW 55) just like any downlink IP packet which is intercepted/consumed by MEC server 30.

Even though FIG. 1 shows an example of one UE 10, a plurality of eNBs 20, one MEC server 30 and one PGW 55, it is to be noted that examples of embodiments are not limited to these numbers. More or less elements or functions can be involved in a control procedure according to examples of embodiments. For example, a group of users including a plurality of UEs may be connected to one or more MEC servers, wherein each of the MEC servers is running an application used by the respective UEs. Furthermore, FIG. 1 shows also links or connections (such as interfaces etc.) between the respective network elements or functions. Details of these links, interfaces and connections may be implementation specific and generally known to those skilled in the art, so that a detailed description of each interface or link between the elements and functions according to an example as shown in FIG. 1 is omitted.

In the following, an implementation of an example of embodiments in the configuration shown in FIG. 1 is described, wherein a charging procedure is assumed to be conducted for a communication concerning a local breakout at MEC.

As indicated above, subscriber related identification data, such as the IMSI information, are required for the charging procedure. Local breakout at MEC is based on other information, such as ERAB filters and L3/L4 filters.

Consequently, according to examples of embodiments, the MEC control element or function, for example MEC charging server 80 prepares a special data packet. For this purpose, the MEC charging server 80 prepares CDR based on application usage and sends the CDR (at bearer level with used IP flows per application) for each serviced UE (in FIG. 1, UE 10) to the core network. For example, the CDR is sent via LTE user plane data as a special UE IP packet, for example a GTP-u packet carrying the CDR. Src address is UE IP address and destination address is the MEC charging server 80 address.

According to examples of embodiments, the special data packet carrying the CDR is sent, for example, on bearer release, handover outside the MEC coverage or call termination.

When the PGW 55 as the core network control element or function receives the special data packet, the PGW 55 enriches the special data packet with subscriber related identification data, which can be deduced from the source address, for example. For instance, the PGW 55 enriches the HTTP header of the special data packet with subscriber's IMSI, MSISDN and UE IP address. By means of this, an enriched data packet is generated comprising the data of the special data packet and the subscriber related identification data, for example.

The above described process is triggered, for example, when it is determined that the destination address of the special data packet is set to the MEC charging server address.

According to some examples of embodiments, the processing related to the enrichment of the special data packet indicated above is based on a corresponding configuration of PCC rules.

Then, the enriched data packet is transferred to the MEC charging server 80. The MEC charging server 80 collects the subscriber ID information from the enriched packet, e.g. from the HTTP header. Furthermore, MEC charging server 80 collects detailed traffic usage from CDR. Then, the MEC charging server 80 generates a new data file, e.g. a MEC CDR file, and sends it to the billing infrastructure, e.g. BOSS 70, directly.

Thereafter, charging support procedures by the EPC 50 is executed in a regular manner. For example, the EPC provides information like MME, S-GW and P-GW CDRs for support charging procedure. This can be done in a conventional way, so that a further description thereof is omitted here.

As described above, for charging procedure, subscriber ID information such as IMSI etc. is required. In order to obtain this information, for example, when a local breakout at MEC was done, the information are filled in the CDR for purpose of charging. Specifically, a PGW header enrichment functionality is used where UE IP packets with a certain destination address are enriched with IMSI; this is based on the configured PCC rules.

Figure 2:
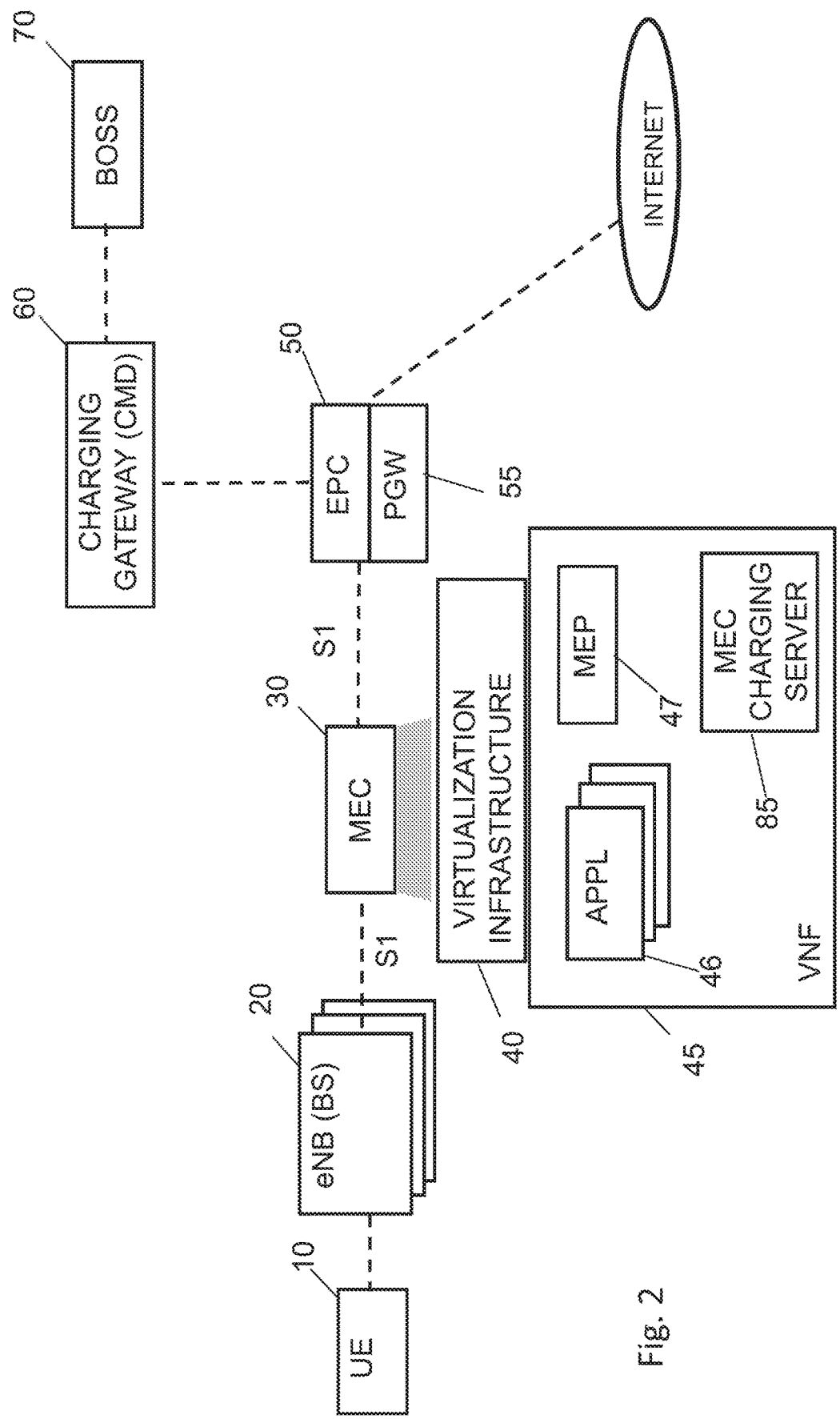
FIG. 2 shows a diagram illustrating a configuration of communication network environment where some examples of embodiments are implementable.

With regard to FIG. 2, a diagram illustrating a further configuration of communication network environment where some examples of embodiments are implementable. Specifically, similar to the example shown in FIG. 1, the example shown in FIG. 2 is related to a case where a local breakout at MEC is made, and subscriber related identification information are required for charging procedure. In contrast to the configuration of FIG. 1, the example in FIG. 2 concerns a case where a MEC charging server is running in MEC tenant at the MEP in the MEC server.

Furthermore, it is to be noted that the structure indicated in FIG. 2 shows only a simplified architecture and hence those parts which are useful for understanding principles underlying some examples of embodiments of the invention. As also known by those skilled in the art there may be several other network elements or devices involved e.g. in a communication which are omitted here for the sake of simplicity. Furthermore, it is to be noted that links indicated in FIG. 2 are intended to show only principle examples of connections between respective network parts. It is possible that also additional or alternative links besides those indicated in FIG. 2 are provided in a corresponding network, and/or that respective network elements or functions communicate with other network elements or functions by using intermediate nodes shown or not shown in FIG. 2. It is to be noted that examples of embodiments are not limited to the number of communication stations, elements, functions, and links as indicated in FIG. 2, i.e. there may be implemented or present less of or more of the corresponding stations, elements, functions, and links than those shown in FIG. 2.

In FIG. 2, elements and functions being comparable to those being implemented in the example shown in FIG. 1 are denoted by the same reference signs, so that a further detailed explanation thereof is omitted herein. Specifically, the communication element 10, the one or more control elements or functions 20 (eNB, micro, pico etc. cell etc.), MEC control element or function 30 (a MEC server), MEP 47, applications 46, VNF environment 45, virtualization infrastructure 40, core network 50, core network control element or function 50 (PGW), charging gateway 60 and BOSS 70 are comparable to those described in connection with FIG. 1.

Reference sign 85 denotes a MEC charging server function. In the present example according to FIG. 2, the MEC charging server function 85 is an application running in the MEC server 80. Due to this, as described in the following, in order to send back the enriched data packet to the charging function at the MEC server, a function like VRF on SGi is used by the EPC.

Similar to the case of FIG. 1, it is to be noted that even though FIG. 2 shows an example of one UE 10, a plurality of eNBs 20, one MEC server 30 and one PGW 55, examples of embodiments are not limited to these numbers. More or less elements or functions can be involved in a control procedure according to examples of embodiments. For example, a group of users including a plurality of UEs may be connected to one or more MEC servers, wherein each of the MEC servers is running an application used by the respective UEs. Furthermore, FIG. 2 shows also links or connections (such as interfaces etc.) between the respective network elements or functions. Details of these links, interfaces and connections may be implementation specific and generally known to those skilled in the art, so that a detailed description of each interface or link between the elements and functions according to an example as shown in FIG. 2 is omitted.

In the following, an implementation of an example of embodiments in the configuration shown in FIG. 2 is described, wherein a charging procedure is assumed to be conducted for a communication concerning a local breakout at MEC.

As indicated above, subscriber related identification data, such as the IMSI information, are required for the charging procedure. Local breakout at MEC is based on other information, such as ERAB filters and L3/L4 filters.

Consequently, according to examples of embodiments, the MEC control element or function, for example MEC charging server 85 prepares a special data packet. For this purpose, the MEC charging server 80 prepares CDR based on application usage and sends the CDR (at bearer level with used IP flows per application) for each serviced UE (in FIG. 2, UE 10) to the core network. For example, the CDR is sent via LTE user plane data as a special UE IP packet, for example a GTP-u packet carrying the CDR. Src address is UE IP address and destination address is the MEC charging server 85 address.

According to examples of embodiments, the special data packet carrying the CDR is sent, for example, on bearer release, handover outside the MEC coverage or call termination.

When the PGW 55 as the core network control element or function receives the special data packet, the PGW 55 enriches the special data packet with subscriber related identification data, which can be deduced from the source address, for example. For instance, the PGW 55 enriches the HTTP header of the special data packet with subscriber's IMSI, MSISDN and UE IP address. By means of this, an enriched data packet is generated comprising the data of the special data packet and the subscriber related identification data, for example.

The above described process is triggered, for example, when it is determined that the destination address of the special data packet is set to the MEC charging server address.

According to some examples of embodiments, the processing related to the enrichment of the special data packet indicated above is based on a corresponding configuration of PCC rules.

Then, the enriched data packet is transferred to the MEC charging server 85 by using VRF at SGi (which represents the interface to the PGW 55). The MEC charging server 85 collects the subscriber ID information from the enriched packet, e.g. from the HTTP header. Furthermore, MEC charging server 85 collects detailed traffic usage from CDR. Then, the MEC charging server 85 generates a new data file, e.g. a MEC CDR file, and sends it to the billing infrastructure, e.g. BOSS 70, directly.

Thereafter, charging support procedures by the EPC 50 is executed in a regular manner. For example, the EPC provides information like MME, S-GW and P-GW CDRs for support charging procedure. This can be done in a conventional way, so that a further description thereof is omitted here.

Figure 3:
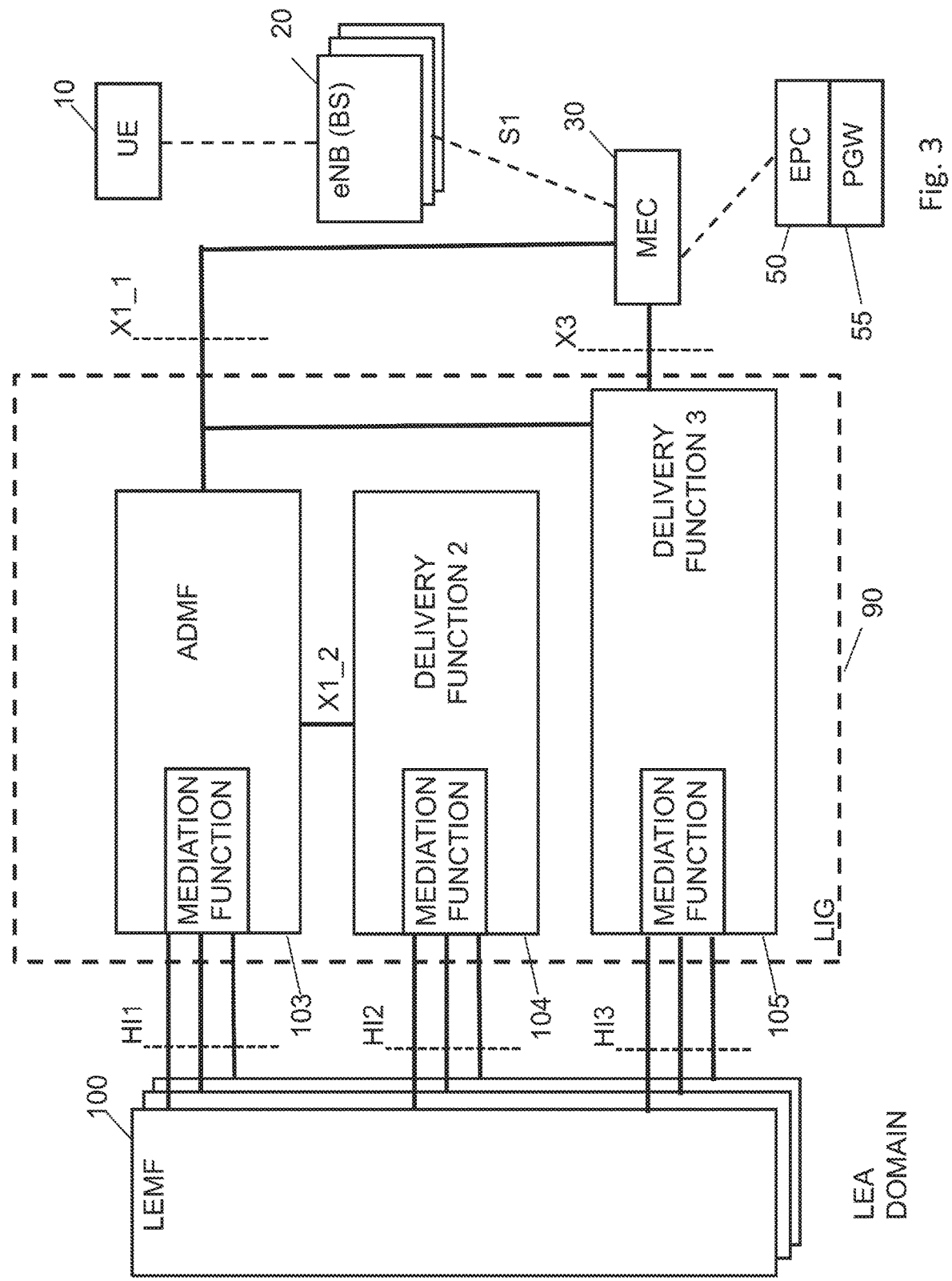
FIG. 3 shows a diagram illustrating a configuration of communication network environment where some examples of embodiments are implementable.

With regard to FIG. 3, a diagram illustrating a further configuration of communication network environment where some examples of embodiments are implementable. Specifically, the example shown in FIG. 3 is related to a case where a local breakout at MEC is made, and subscriber related identification information are required for lawful interception procedure.

Furthermore, it is to be noted that the structure indicated in FIG. 3 shows only a simplified architecture and hence those parts which are useful for understanding principles underlying some examples of embodiments of the invention. As also known by those skilled in the art there may be several other network elements or devices involved e.g. in a communication which are omitted here for the sake of simplicity. Furthermore, it is to be noted that links indicated in FIG. 3 are intended to show only principle examples of connections between respective network parts. It is possible that also additional or alternative links besides those indicated in FIG. 3 are provided in a corresponding network, and/or that respective network elements or functions communicate with other network elements or functions by using intermediate nodes shown or not shown in FIG. 3. It is to be noted that examples of embodiments are not limited to the number of communication stations, elements, functions, and links as indicated in FIG. 3, i.e. there may be implemented or present less of or more of the corresponding stations, elements, functions, and links than those shown in FIG. 3.

In FIG. 3, elements and functions being comparable to those being implemented in the example shown in FIG. 1 are denoted by the same reference signs, so that a further detailed explanation thereof is omitted herein. Specifically, the communication element 10, the one or more control elements or functions 20 (eNB, micro, pico etc. cell etc.), a MEC control element or function 30 (a MEC server), core network 50 and core network control element or function 50 (PGW) are comparable to those described in connection with FIG. 1. It is to be noted that even though FIG. 3 shows an example of one UE 10, a plurality of eNBs 20, one MEC server 30 and one PGW 55, examples of embodiments are not limited to these numbers. More or less elements or functions can be involved in a control procedure according to examples of embodiments. For example, a group of users including a plurality of UEs may be connected to one or more MEC servers, wherein each of the MEC servers is running an application used by the respective UEs. Furthermore, FIG. 3 shows also links or connections (such as interfaces etc.) between the respective network elements or functions. Details of these links, interfaces and connections may be implementation specific and generally known to those skilled in the art, so that a detailed description of each interface or link between the elements and functions according to an example as shown in FIG. 3 is omitted.

Lawful interception is a procedure allowing to obtain communication network data pursuant to lawful authority for the purpose of analysis or evidence. Such data generally consist of signalling or network management information or the content of the communications. For this purpose, law enforcement agencies (LEA), which are organizations authorized, by a lawful authorization based on a national law, to request interception measures and to receive the results of telecommunications interceptions, are provided with one or more law enforcement monitoring facilities (LEMF) 100, which are respective law enforcement facilities designated as the transmission destination for the results of interception relating to a particular interception subject. The LEMF 100 is connected via a handover interface (HI) to mediation function (i.e. mechanism which passes information between an access provider or network operator or service provider and a handover interface) to a lawful interception gateway (LIG) 90 for requesting interception measures and obtaining the results of interception.

The LIG 90 is a network functionality providing authorities with the ability to intercept mobile data calls. In the LIG 90, an ADMF 103 controls the interception and contains an interface for one or more LEAs and authorization authorities. Permission to intercept subscriber's traffic is given to the ADMF 103, i.e. LEA activates and deactivates interceptions through this interface by using International Mobile Subscriber Identity (IMSI) or Mobile Station ISDN Number (MSISDN) as target identifiers Reference signs 104 and 105 denote delivery functions in the LIG 90. Here, interception related information (IRI) and communication content (CC) which are sent as such to the defined LEA(s) can be temporally stored, wherein delivery function 104 is used for IRI and delivery function 105 is used for CC, for example. IRI is a collection of information or data associated with telecommunication services involving the target identity, specifically call associated information or data (e.g. unsuccessful call attempts), service associated information or data (e.g. service profile management by subscriber) and location information, while CC concerns information exchanged between two or more users of a telecommunications service, excluding IRI.

In the following, an implementation of an example of embodiments in the configuration shown in FIG. 3 is described, wherein a lawful interception procedure is assumed to be conducted for a communication concerning a local breakout at MEC.

When the LIG 90 is integrated with the MEC based configuration, the IMSI of subscriber who's traffic needs to be intercepted is provisioned to the MEC 30 via X1_1 interface. It is to be noted that the interception concerns the CC of the traffic in question, while IRI is not required at MEC. In other words, for lawful interception, communication context at target's bearer is required to be supported at MEC for all traffic which is not visible to core but visible at MEC.

As indicated above, subscriber related identification data, such as the IMSI or MSISDN, are required for the LI procedure. Local breakout at MEC is based on other information, such as ERAB filters and L3/L4 filters.

Consequently, according to examples of embodiments, the MEC control element or function, for example MEC server 30, prepares a special data packet. This data packet is prepared, for example, when the first user plane packet for an user is received. In other words, preparation for LI is started when the communication of the UE 10 via the local breakout begins.

The MEC server 30 sends the special packet to the core network, for example, via LTE user plane data as a special UE IP packet, e.g. a GTP-u packet. Src address is UE IP address and destination address is the MEC server 30 address.

When the PGW 55 as the core network control element or function receives the special data packet, the PGW 55 enriches the special data packet with subscriber related identification data, which can be deduced from the source address, for example. For instance, the PGW 55 enriches the HTTP header of the special data packet with subscriber's IMSI, MSISDN and UE IP address. By means of this, an enriched data packet is generated comprising the data of the special data packet and the subscriber related identification data, for example.

The above described process is triggered, for example, when it is determined that the destination address of the special data packet is set to the MEC server address.

According to some examples of embodiments, the processing related to the enrichment of the special data packet indicated above is based on a corresponding configuration of PCC rules.

Then, the enriched data packet is transferred to the MEC server 30. For example, this is done by using VRF at SGi (which represents the interface to the PGW 55).

The MEC server 30 collects the subscriber ID information from the enriched packet, e.g. from the HTTP header. Then, when receiving a demand regarding LI, the related traffic (CC) is forwarded by the MEC server 30 to the LIG 90 via X3 interface (i.e. to delivery function 3 105.

Figure 4:
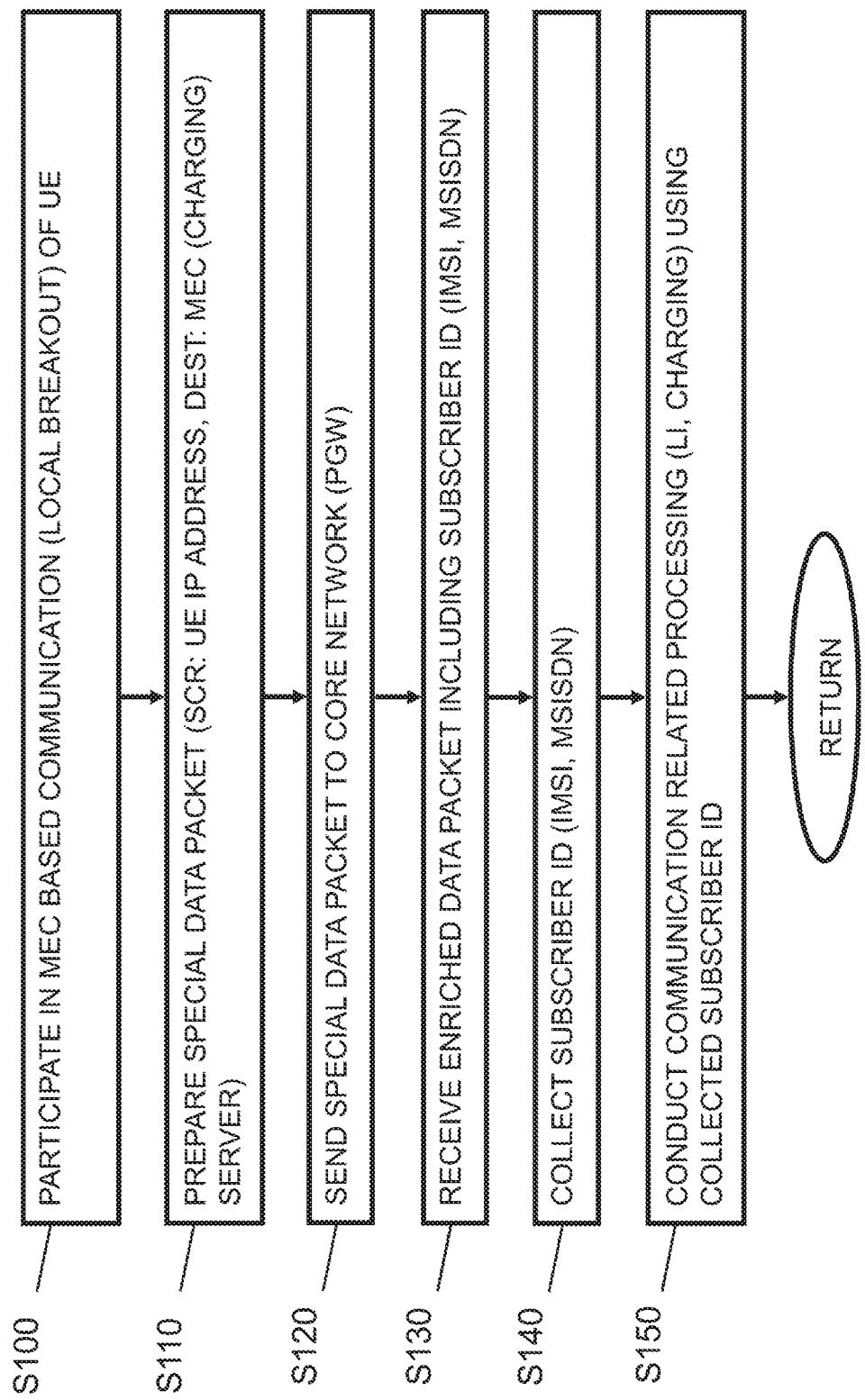
FIG. 4 shows a flow chart of a processing conducted in a mobile edge control element or function according to some examples of embodiments.

FIG. 4 shows a flow chart of a processing conducted in a mobile edge control element or function according to some examples of embodiments. Specifically, the example according to FIG. 4 is related to a procedure conducted by a mobile edge control element or function, such as the MEC server 30 or MEC charging server 80, as shown in connection with FIGS. 1 to 3.

In S100, a MEC based communication of at least one communication element like UE 10 is participated in a communication network. For example, the MEC based communication of the UE 10 being participated comprises a local breakout based on filters (ERAB, L3/L4 filters) wherein information required for other procedures, such as charging or LI, are not provided.

In S110, a special data packet is prepared. The special data packet includes, as a packet source indication, an address information of the at least one communication element (e.g. the UE IP address) and, as a packet destination indication, an address information of the mobile edge control element or function.

In S120, the special data packet is sent to a core network control element or function.

In S130, an enriched data packet is received and processed. The enriched data packet is based on the special data packet, i.e. comprises the information included in the special data packet. Furthermore, the enriched data packet includes subscriber related identification data for the at least one communication element. For example, the subscriber related identification data comprises at least one of an IMSI, a MSISDN, and an UE IP address.

In S140, the subscriber related identification data are collected from the enriched data packet.

Then, in S150, a communication related processing related to the at least one communication element is conducted, wherein the collected subscriber related identification data are used. For example, as the communication related processing related to the at least one communication element, a charging processing and/or a lawful interception (LI) processing can be conducted.

It is to be noted that according to examples of embodiments, the MEC control element or function is one of a MEC server (e.g. MEC server 30), a MEC charging server (e.g. MEC charging server 80, 85), and a mobile edge platform. Furthermore, the communication network control element or function is one of a core network control element or function, in particular a packet gateway of a cellular communication network, like PGW 55.

According to some examples of embodiments, when the communication related processing being conducted in S150 is a charging processing, the processing in S110 may comprise, for example, to prepare and include, into the special data packet, CDR data related to the mobile edge computing based communication of the at least one communication element. This special data packed is then sent, in S120, via a user plane data communication to the core network control element or function (e.g. PGW 55) when at least one of a bearer release, a handover to a different coverage area (i.e. outside MEC server 30, for example) and a termination of the MEC based communication of the UE 10 occurs.

Furthermore, according to some examples of embodiments, when the communication related processing being conducted in S150 is a charging processing, the processing in S150 may further comprise to generate a data set related to the subscriber related identification information and including call data record data related to the MEC based communication of the UE 10. The data set is then sent (directly) to a billing and order support system (e.g. BOSS 70) of the communication network.

On the other hand, according to some examples of embodiments, when the communication related processing in S150 is a lawful interception processing, the processing in S110 may comprise to send the special data packet when a first user plane packet for the UE 10 is received.

Furthermore, according to some examples of embodiments, when the communication related processing in S150 is the lawful interception processing, the processing in S150 may further comprise to receive and process a lawful interception demand from an administration function (e.g. ADMF 103) of a lawful interception gateway element or function (LIG). The demand includes, for example, subscriber related identification information (e.g. IMSI) for a communication element (e.g. UE 10) whose traffic is to be intercepted. The traffic to be intercepted is then determined on the basis of the subscriber related identification information received in the lawful interception demand and the subscriber related identification information received in the enriched data packet in S130. The determined traffic to be intercepted is then forwarded to the lawful interception gateway element or function (LIG) by the MEC server 30, for example.

Figure 5:
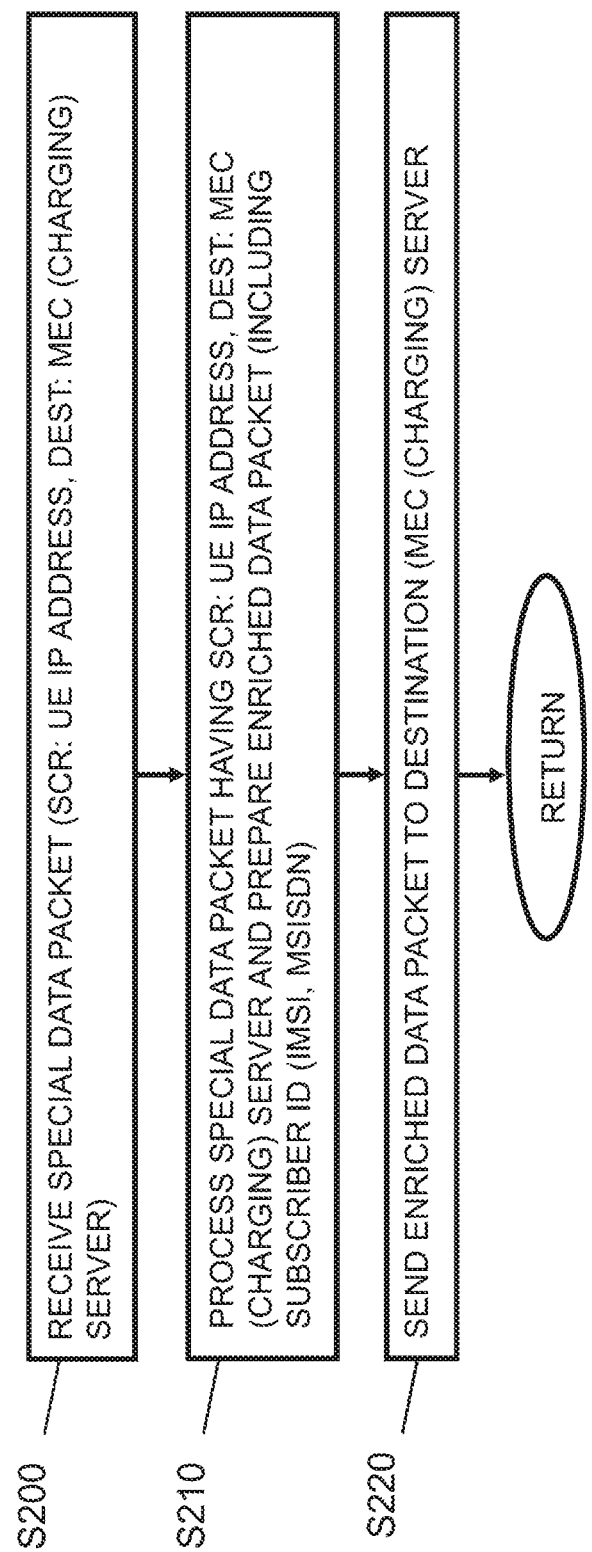
FIG. 5 shows a flow chart of a processing conducted in a communication network control element or function according to some examples of embodiments.

FIG. 5 shows a flow chart of a processing conducted in a communication network control element or function according to some examples of embodiments. Specifically, the example according to FIG. 5 is related to a procedure conducted by a core network control element or function, such as the PGW 55, as shown in connection with FIGS. 1 to 3.

In S200, a special data packet is received from a mobile edge control element or function, wherein the special data packet includes, as a packet source indication, an address information of at least one communication element (e.g. UE 10) and, as a packet destination indication, an address information of the mobile edge control element or function.

In S210, the special data packet is processed when it is determined that the packet source indication is an address information of at least one communication element and the packet destination indication is an address information of the mobile edge control element or function. The processing includes preparing an enriched data packet by enriching the data contained in the special data packet with subscriber related identification data for the at least one communication element. For example, the subscriber related identification data comprises at least one of an IMSI, a MSISDN, and an IP address of the UE 10.

In S220, the enriched data packet is sent to the MEC control element or function indicated in the packet destination indication. For example, the enriched data packet is sent to the MEC control element or function indicated in the packet destination indication by using a VRF.

Figure 6:
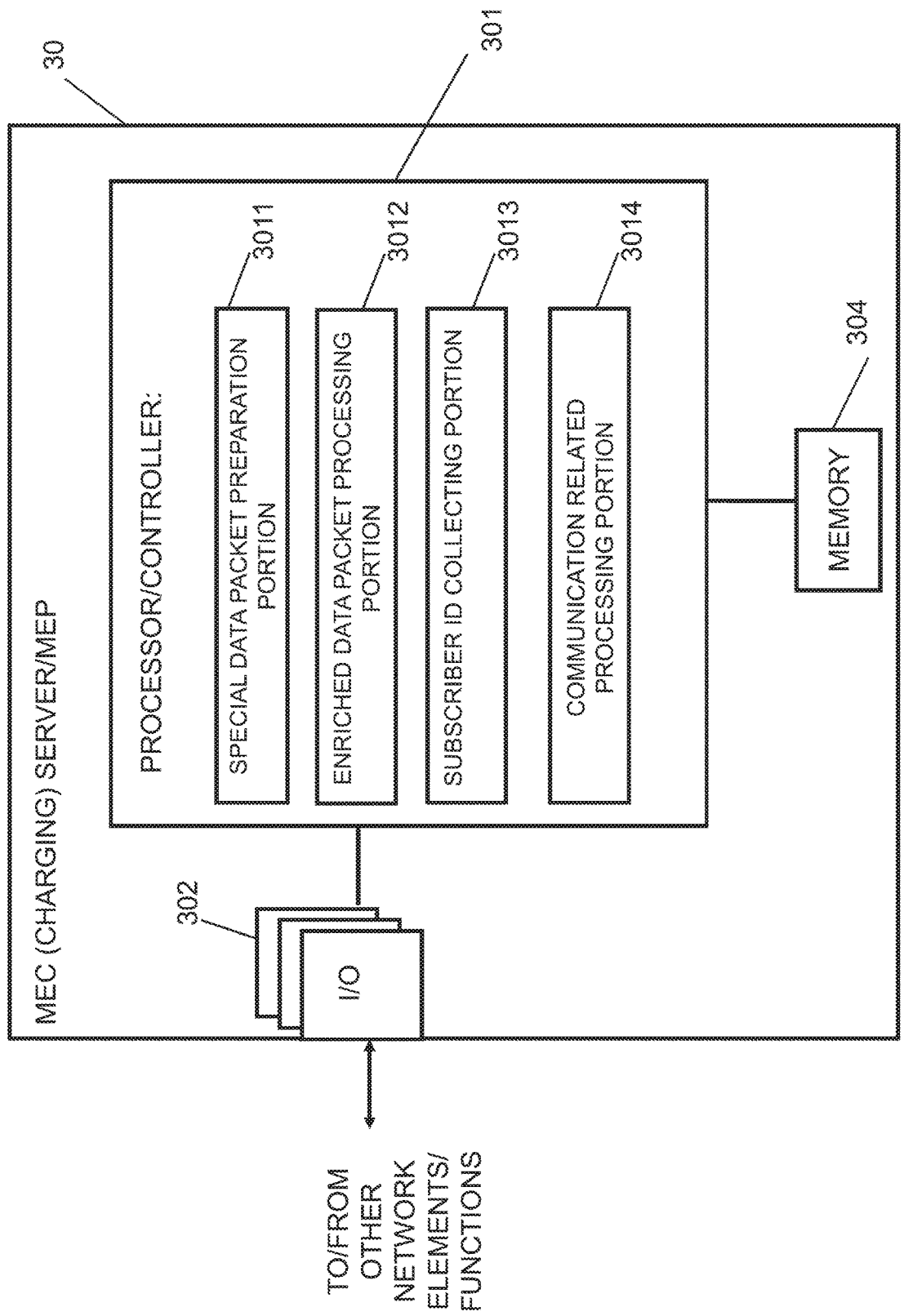
FIG. 6 shows a diagram of a network element or function acting as a mobile edge control element or function according to some examples of embodiments.

FIG. 6 shows a diagram of a network element or function acting as a mobile edge control element or function according to some examples of embodiments, e.g. as MEC server 30 or MEC charging server 80, 85, which is configured to implement a procedure for supporting services in the MEC system as described in connection with some of the examples of embodiments. It is to be noted that the network element or function, like the MEC server 30 of FIGS. 1 to 3, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The MEC server 30 shown in FIG. 6 may include a processing circuitry, a processing function, a control unit or a processor 301, such as a CPU or the like, which is suitable for executing instructions given by programs or the like related to the control procedure. The processor 301 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 302 denotes input/output (I/O) units or functions (interfaces) connected to the processor or processing function 301. The I/O units 302 may be used for communicating with the communication network and/or other entities or functions, as described in connection with FIGS. 1 to 3, for example. The I/O units 302 may be a combined unit including communication equipment towards several entities, or may include a distributed structure with a plurality of different interfaces for different entities. Reference sign 304 denotes a memory usable, for example, for storing data and programs to be executed by the processor or processing function 301 and/or as a working storage of the processor or processing function 301. It is to be noted that the memory 304 may be implemented by using one or more memory portions of the same or different type of memory.

The processor or processing function 301 is configured to execute processing related to the above described procedure for location related application management processing. In particular, the processor or processing circuitry or function 301 includes one or more of the following sub-portions. Sub-portion 3011 is a processing portion which is usable as a portion for preparing the special data packet. The portion 3011 may be configured to perform processing according to S110 of FIG. 4. Furthermore, the processor or processing circuitry or function 301 may include a sub-portion 3012 usable as a portion for processing an enriched data packet. The portion 3012 may be configured to perform a processing according to S130 of FIG. 4. In addition, the processor or processing circuitry or function 301 may include a sub-portion 3013 usable as a portion for collecting subscriber ID data. The portion 3013 may be configured to perform a processing according to S140 of FIG. 4. Moreover, the processor or processing circuitry or function 301 may include a sub-portion 3014 usable as a portion for conducting a communication related processing. The portion 3014 may be configured to perform a processing according to S150 of FIG. 4.

Figure 7:
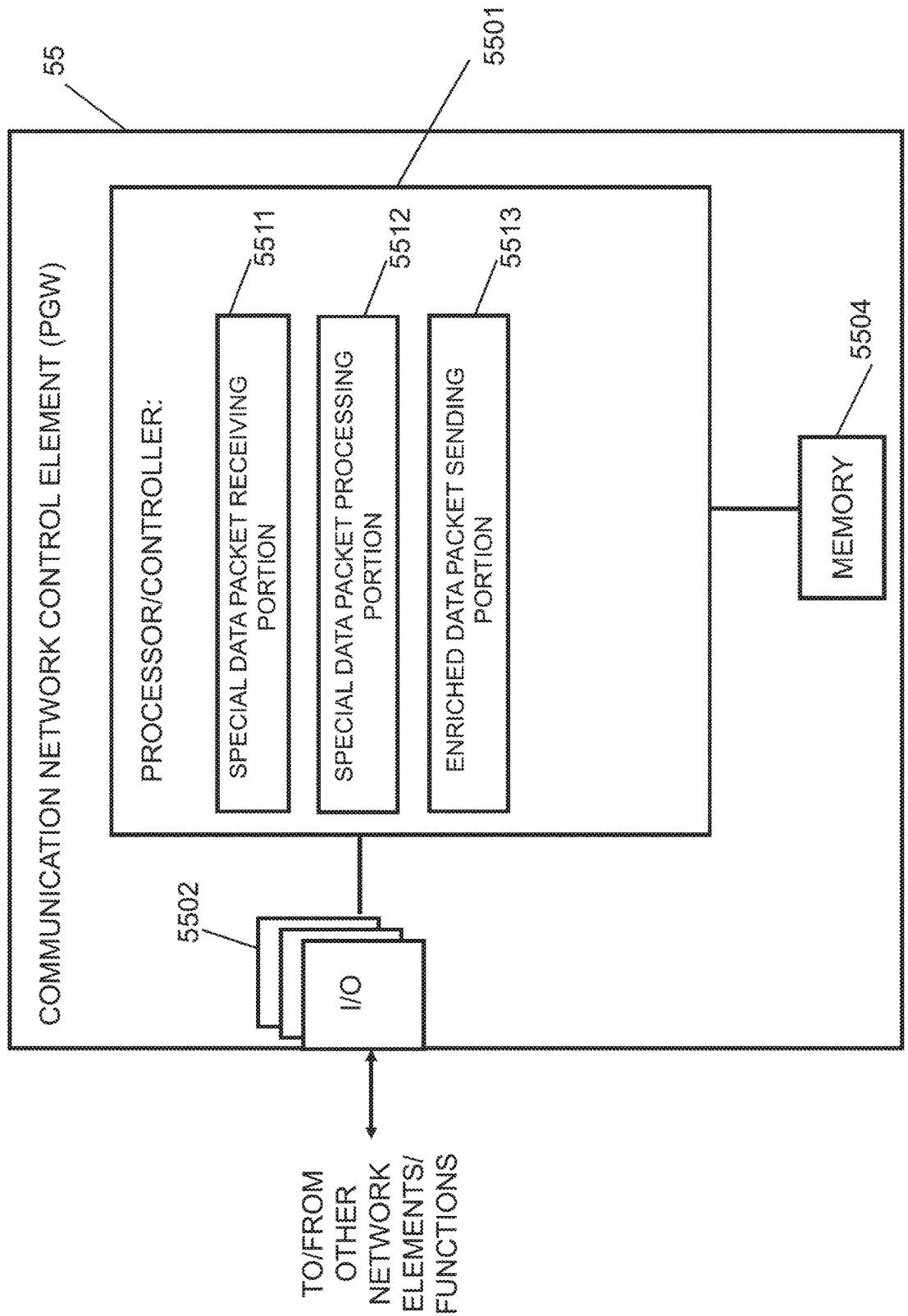
FIG. 7 shows a diagram of a network element or function acting as a communication network control element according to some examples of embodiments.

FIG. 7 shows a diagram of a network element or function acting as a communication network control element or function according to some examples of embodiments, e.g. as PGW 55, which is configured to implement a procedure for supporting services in the MEC system as described in connection with some of the examples of embodiments. It is to be noted that the network element or function, like the PGW 55 of FIGS. 1 to 3, may include further elements or functions besides those described herein below. Furthermore, even though reference is made to a communication network control element, the element or function may be also another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/ or circuitry.

The PGW 55 shown in FIG. 7 may include a processing circuitry, a processing function, a control unit or a processor 5501, such as a CPU or the like, which is suitable for executing instructions given by programs or the like related to the control procedure. The processor 5501 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 5502 denotes input/output (I/O) units or functions (interfaces) connected to the processor or processing function 5501. The I/O units 5502 may be used for communicating with the communication network and/or other entities or functions, as described in connection with FIGS. 1 to 3, for example. The I/O units 5502 may be a combined unit including communication equipment towards several entities, or may include a distributed structure with a plurality of different interfaces for different entities. Reference sign 5504 denotes a memory usable, for example, for storing data and programs to be executed by the processor or processing function 5501 and/or as a working storage of the processor or processing function 5501. It is to be noted that the memory 5504 may be implemented by using one or more memory portions of the same or different type of memory.

The processor or processing function 5501 is configured to execute processing related to the above described procedure for location related application management processing. In particular, the processor or processing circuitry or function 5501 includes one or more of the following sub-portions. Sub-portion 5511 is a processing portion which is usable as a portion for receiving a special data packet. The portion 5511 may be configured to perform processing according to S200 of FIG. 5. Furthermore, the processor or processing circuitry or function 5501 may include a sub-portion 5512 usable as a portion for processing a special data packet. The portion 5512 may be configured to perform a processing according to S210 of FIG. 5. In addition, the processor or processing circuitry or function 5501 may include a sub-portion 5513 usable as a portion for sending an enriched data packet. The portion 5513 may be configured to perform a processing according to S220 of FIG. 5.

It is to be noted that examples of embodiments of the invention are applicable to various different network configurations. In other words, the examples shown in FIGS. 1 to 3, which are used as a basis for the above discussed examples, are only illustrative and do not limit the present invention in any way. That is, additional further existing and proposed new functionalities available in a corresponding operating environment may be used in connection with examples of embodiments of the invention based on the principles defined.

It is to be noted that the measures described in the present specification can be executed on top of common/general measures or communication procedures. Some of the measures described in the present specification can be applied separately, some in various combinations, or all measures can be combined in one procedure.

According to a further example of embodiments, there is provided, for example, an apparatus for use by a mobile edge control element or function, the apparatus comprising means configured to participate in a mobile edge computing based communication of at least one communication element in a communication network, means configured to prepare and send a special data packet to a core network control element or function, wherein the special data packet includes, as a packet source indication, an address information of the at least one communication element and, as a packet destination indication, an address information of the mobile edge control element or function, means configured to receive and process an enriched data packet being based on the special data packet, the enriched data packet including subscriber related identification data for the at least one communication element, means configured to collect the subscriber related identification data from the enriched data packet, and means configured to conduct a communication related processing related to the at least one communication element using the collected subscriber related identification data.

Furthermore, according to some other examples of embodiments, the above defined apparatus may further comprise means for conducting at least one of the processing defined in the above described methods, for example a method according that described in connection with FIG. 4.

According to a further example of embodiments, there is provided, for example, an apparatus for use by a communication network control element or function, the apparatus comprising means configured to receive a special data packet from a mobile edge control element or function, wherein the special data packet includes, as a packet source indication, an address information of at least one communication element and, as a packet destination indication, an address information of the mobile edge control element or function, means configured to process the special data packet, when it is determined that the packet source indication is an address information of at least one communication element and the packet destination indication is an address information of the mobile edge control element or function, wherein the processing includes preparing an enriched data packet by enriching the data contained in the special data packet with subscriber related identification data for the at least one communication element, and means configured to send the enriched data packet to the mobile edge control element or function indicated in the packet destination indication.

Furthermore, according to some other examples of embodiments, the above defined apparatus may further comprise means for conducting at least one of the processing defined in the above described methods, for example a method according that described in connection with FIG. 5.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus, the apparatus comprising:
   processing circuitry, and
   at least one memory for storing instructions to be executed by the processing circuitry,
   wherein the at least one memory and the instructions are configured to, with the processing circuitry, manipulate the apparatus to:
   participate in a mobile edge computing-based communication of at least one communication element in a communication network,
   prepare and send a first data packet to a core network control element or function, wherein the first data packet includes, as a packet source indication, an address information of the at least one communication element and, as a packet destination indication, an address information of a mobile edge control charging server,
   receive and process a second data packet being based on the first data packet, the second data packet including subscriber related identification data for the at least one communication element,
   collect the subscriber related identification data from the second data packet,
   conduct a communication related processing comprising a charging processing related to the at least one communication element using the collected subscriber related identification data;
   generate a data set related to the subscriber related identification data and including call data record data related to the mobile edge computing-based communication of the at least one communication element; and
   send the data set to a billing and order support system of the communication network.

2. The apparatus according to claim 1, wherein:
the mobile edge computing based communication of the at least one communication element in the communication network being participated comprises a local breakout based on filters being different to the subscriber related identification data.

3. The apparatus according to claim 1, wherein:
the subscriber related identification data comprises at least one of an international mobile subscriber ID, a mobile station international subscriber directory number, and an IP address of the at least one communication element.

4. The apparatus according to claim 1, wherein the at least one memory and the instructions are further configured to, with the processing circuitry, manipulate the apparatus to:
further conduct, as the communication related processing related to the at least one communication element, a lawful interception processing.

5. The apparatus according to claim 4, the at least one memory and the instructions are further configured to, with the processing circuitry, manipulate the apparatus to:
send the first data packet when a first user plane packet for the at least one communication element is received.

6. The apparatus according to claim 4, the at least one memory and the instructions are further configured to, with the processing circuitry, manipulate the apparatus to:
receive and process a lawful interception demand from an administration function of a lawful interception gateway element or function, the demand including subscriber related identification information for a communication element whose traffic is to be intercepted,
determine the traffic to be intercepted on the basis of the subscriber related identification information received in the lawful interception demand and the subscriber related identification information received in the second data packet, and
forward the determined traffic to be intercepted to the lawful interception gateway element or function.

7. The apparatus according to claim 1, the at least one memory and the instructions are further configured to, with the processing circuitry, manipulate the apparatus to:
prepare and include, into the first data packet, call data record data related to the mobile edge computing-based communication of the at least one communication element, and
send the first data packet via a user plane data communication to the core network control element or function when at least one of a bearer release, a handover to a different coverage area and a termination of the mobile edge computing based communication of the at least one communication element occurs.

8. The apparatus according to claim 1, wherein
a mobile edge control element or function is one of a mobile edge computing server and a mobile edge platform, and
the communication element is a user equipment or terminal device capable of communicating in a cellular communication network.

9. A method comprising:
participating in a mobile edge computing-based communication of at least one communication element in a communication network;
preparing and sending a first data packet to a core network control element or function, wherein the first data packet includes, as a packet source indication, an address information of the at least one communication element and, as a packet destination indication, an address information of a mobile edge control charging server;
receiving and processing an second data packet being based on the first data packet, the second data packet including subscriber related identification data for the at least one communication element;
collecting the subscriber related identification data from the second data packet;
conducting a communication related processing comprising a charging processing related to the at least one communication element using the collected subscriber related identification data;
generate a data set related to the subscriber related identification data and including call data record data related to the mobile edge computing-based communication of the at least one communication element; and
send the data set to a billing and order support system of the communication network.

10. The method according to claim 9, wherein
the mobile edge computing-based communication of the at least one communication element in the communication network being participated comprises a local breakout based on filters being different to the subscriber related identification data.

11. The method according to claim 9, wherein:
the subscriber related identification data comprises at least one of an international mobile subscriber ID, a mobile station international subscriber directory number, and an IP address of the at least one communication element.

12. The method according to claim 9, further comprising:
further conducting, as the communication related processing related to the at least one communication element, a lawful interception processing.

13. The method according to claim 12, further comprising:
sending the first data packet when a first user plane packet for the at least one communication element is received.

14. The method according to claim 12, further comprising:
receiving and processing a lawful interception demand from an administration function of a lawful interception gateway element or function, the demand including subscriber related identification information for a communication element whose traffic is to be intercepted,
determining the traffic to be intercepted on the basis of the subscriber related identification information received in the lawful interception demand and the subscriber related identification information received in the second data packet, and
forwarding the determined traffic to be intercepted to the lawful interception gateway element or function.

15. The method according to claim 9, further comprising:
preparing and including, into the first data packet, call data record data related to the mobile edge computing-based communication of the at least one communication element, and
sending the first data packet via a user plane data communication to the core network control element or function when at least one of a bearer release, a handover to a different coverage area and a termination of the mobile edge computing based communication of the at least one communication element occurs.

16. The method according to claim 9, wherein:
a mobile edge control element or function is one of a mobile edge computing server and a mobile edge platform, and
the communication element is a user equipment or terminal device capable of communicating in a cellular communication network.

\* \* \* \* \*